United States Patent [19]

Lang et al.

[11] Patent Number: 5,516,143
[45] Date of Patent: May 14, 1996

[54] WINDOWED AIRBAG COVER

[75] Inventors: Gregory J. Lang, Ogden; Bradley D. Harris, Farmington, both of Utah

[73] Assignee: Morton International, Inc., Chicago, Ill.

[21] Appl. No.: 262,883

[22] Filed: Jun. 20, 1994

[51] Int. Cl.⁶ .............................. B60R 21/20; B60Q 1/00
[52] U.S. Cl. ..................... 280/728.3; 280/731; 362/80; 200/313
[58] Field of Search .................. 280/728 B, 731, 280/728 R, 730 R, 732, 728.3, 728.1, 730.1; 362/80, 83.3, 95; 200/313, 314, 315, 317, 61.54

[56] References Cited

U.S. PATENT DOCUMENTS

| | | | |
|---|---|---|---|
| 4,343,975 | 8/1982 | Sado | 200/314 |
| 4,368,454 | 1/1983 | Pilatzki | 340/22 |
| 4,493,958 | 1/1985 | Hamilton et al. | 200/314 |
| 4,811,175 | 3/1989 | DeSmet | 362/95 |
| 4,934,735 | 6/1990 | Embach | 280/731 |
| 5,062,661 | 11/1991 | Winget | 280/728 B |
| 5,085,461 | 2/1992 | Shibata | 280/731 |
| 5,181,773 | 1/1993 | Colvin | 362/83.3 |
| 5,338,906 | 8/1994 | Yokota | 200/61.54 |
| 5,369,232 | 11/1994 | Leonelli | 280/731 |

FOREIGN PATENT DOCUMENTS

| | | |
|---|---|---|
| 0283188 | 9/1988 | European Pat. Off. . |
| 2711192 | 9/1978 | Germany . |
| 3619937 | 12/1987 | Germany . |
| 5101736 | 4/1993 | Japan ............................ 200/313 |
| 2252268 | 8/1992 | United Kingdom .............. 280/728 B |

OTHER PUBLICATIONS

Patent Abstracts of Japan, Japanese Pat. Pub'l. 4-274947, Sep. 1992.
Patent Abstracts of Japan, Japanese Pat. Pub'l. 2-120154, May 1990.
EPO Search Report of Ser. No. 95304126, Sep. 1995.

*Primary Examiner*—Eric D. Culbreth
*Assistant Examiner*—Peter C. English
*Attorney, Agent, or Firm*—George W. Rauchfuss, Jr.; Gerald K. White

[57] ABSTRACT

A molded cover for an automotive airbag module is provided with one or more windows therethrough to transmit light from a light source within said module. The light source is typically used to indicate the location or identify function switches under the molded cover.

18 Claims, 1 Drawing Sheet

WINDOWED AIRBAG COVER

TECHNICAL FIELD

This invention relates to the field of automotive airbags. More specifically, it relates to an improved cover for such airbags.

BACKGROUND ART

The driver's side automotive airbag is widely installed in automotive vehicles. Conventionally, the airbag module stored within the steering wheel takes the form of a reaction canister which houses a folded airbag. An igniter is actuated by a crash sensor to combust a generant and provide the gas for inflating the airbag. The canister and folded airbag are enclosed by a plastic cover which fills the central part of the steering wheel. The plastic cover normally is provided with tearlines which burst under the influence of the expanding airbag, allowing the airbag to expand into the driver's compartment to protect the head and upper torso of the driver.

While the airbag module placement is well-suited to protect the driver, it preempts the location favored by many automobile stylists for function and accessory switches for such accessories as radio, ventilation, and air conditioning controls. Although some switches, such as for the horn, may be installed for actuation through the module cover, others require back-lighting. Accordingly, it is a primary object of the present invention to provide an improved airbag module cover which is formed with windows therein to permit back-lighting of switches or displays. Other objects, features, and advantages will become apparent from the following description and appended claims.

DISCLOSURE OF INVENTION

The invention comprises a plastic airbag cover which incorporates windows to permit passage of light from sources inside the cover.

BEST MODE FOR CARRYING OUT THE INVENTION

Figure 1:
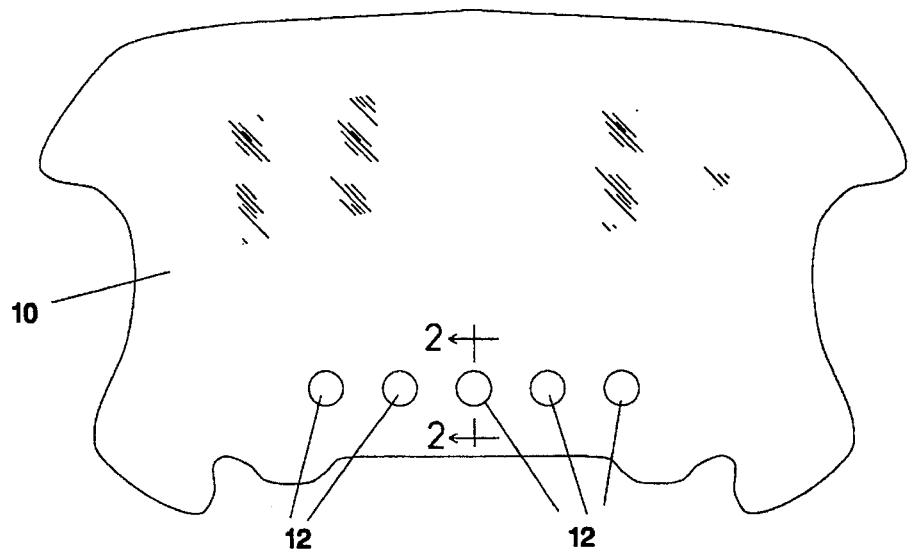
FIG. 1 is an elevational view of a plastic airbag cover in accordance with the present invention.

Illustrated in FIG. 1 is a plastic cover 10 for a driver side airbag module. In shape and composition the cover 10 is basically conventional and, accordingly, is not described in detail. It includes the requisite tearlines and the mounting projections required for mounting it to the reaction canister of an airbag module assembly.

Figure 2:
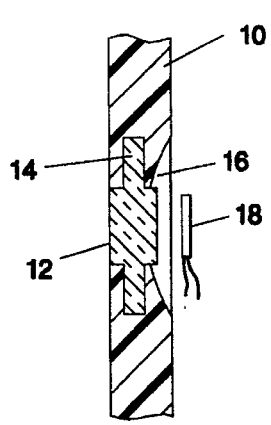
FIG. 2 is an enlarged cross-section taken substantially along the line 2—2 of FIG. 1.

The distinguishing feature of the airbag module cover 10 is the presence of a plurality of light transmitting windows 12 in the front surface of the cover. One method for achieving the desired windows is illustrated in FIG. 2. In this embodiment the transparent window 12 is in the form of a cylindrical body surrounded by a circular flange 14. The pre-formed window 12 would be installed in an injection mold prior to injecting the plastic forming the body of the cover 10. The plastic material of the cover 10 would surround the flange 14. After completion of the molding step and removal from the mold, the cover 10 would hold the window 12 firmly in place. Although the window 12 is shown as a circular or cylindrical body in the Figure, it will be appreciated that the window may be of any suitable shape, such as for example, circular, square, rectangular, elliptical, oval or the like.

The embodiment illustrated in FIG. 2 shows a thinned cover region 16 surrounding the window area. This feature achieves two functions. First, it reduces the stiffness of the cover material in the region of the window 12, thereby making it easier to activate an underlying switch. Second, it permits the thickness of the window to be less than that of the cover material. This permits use of a window 12 material which has a relatively low degree of transparency. Also illustrated in FIG. 2 is a light source 18, such as a light-emitting diode. The diode or other light source such as an electroluminescent material could be, for example, mounted upon the switch. The latter, not being a part of this invention, is not further disclosed.

The invention is not limited to the particular method of incorporating a window into an airbag cover. An injection molding method is described above. Another technique would involve a two shot molding process. A translucent or transparent material could be injected into the mold to form the windows. The balance of the cover would then be molded using a desired cover material. Alternatively, the material for the cover could be injection molded first and then the translucent or transparent material could thereafter be injected into the mold to form the windows. This technique would produce a single piece cover with one or more windows to allow the passage of light.

Figure 3:
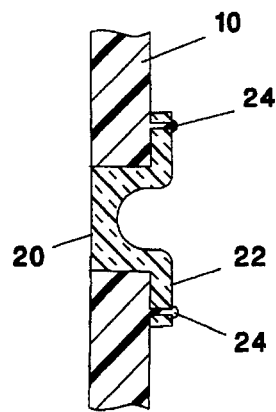
FIG. 3 is a view similar to that of FIG. 2, illustrating a modification of the invention.
Figures 4, 5:
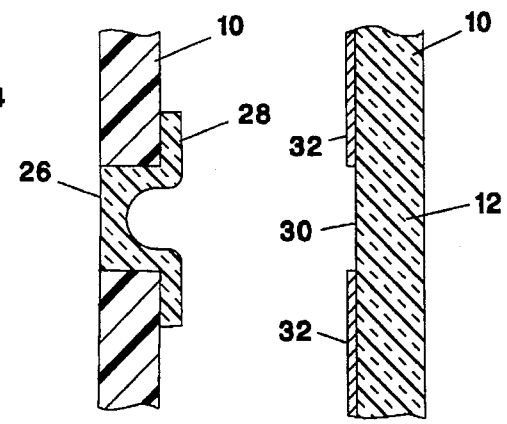
FIG. 4 is a view similar to that of FIG. 3 illustrating a further modification.
FIG. 5 is a view similar to that of FIG. 2 illustration a further embodiment.

In another technique, holes could be molded into the cover or punched through the cover after forming. The holes could then be filled with the translucent or transparent material, as either liquid or preformed solid. Two versions of the latter are illustrated in FIGS. 3 and 4. FIG. 3 illustrates a solid window 20 which is pushed through a hole in the cover 10. The window includes a flange 22 which is secured to the cover by a plurality of heat-staked rivets 24. FIG. 4 illustrates a similar window 26 whose flange 28 is secured to the cover 10 by ultrasonic welding, adhesives, or other suitable means.

In a still further method, the entire module cover could be formed of a transparent or translucent plastic material which is capable of being painted or otherwise colored or dyed as illustrated in FIG. 5. In this method, after forming the module cover 10, areas 30 where windows are desired are blocked against painting and the remainder of the cover 32 is painted to make it opaque, leaving transparent windows 12 in the blocked areas.

The windows may be made of any suitable transparent or translucent material, especially from transparent or translucent thermoplastic polymers. For example, the windows could be formed from any suitable transparent or translucent thermoplastic polyurethane elastomer, a polypropylene alloy based elastomer such as Santoprene, or the like. In general, the cover will be made of any suitable opaque material, such as for example, a thermoplastic resin such as an opaque styrene based thermoplastic resin sold under the trade name Multibase resins or a copolyester resin available from Du Pont Co. under the brand name DYM resins.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. An automotive vehicle airbag module having a light emitter incorporated therein and a cover for said airbag module having at least one light transmitting window integral with a front surface of said cover for transmitting light from said light emitter within said module to a vehicle occupant and wherein a portion of the cover immediately adjacent each said window is thinned to increase its flexibility.

2. The airbag module of claim 1 comprising a plurality of windows in said cover.

3. The automotive vehicle airbag module of claim 2 wherein the light emitter is a light emitting diode.

4. The airbag module of claim 1 wherein said cover and the at least one window are thermoplastic polymeric materials and the cover is of a different thermoplastic polymeric material than that of the at least one window.

5. The automotive vehicle airbag module of claim 4 wherein the light emitter is a light emitting diode.

6. The automotive vehicle airbag module of claim 1 wherein the light emitter is a light emitting diode.

7. The airbag module of claim 6 wherein the cover has a thickness greater than a thickness of the at least one window.

8. The airbag module of claim 1 wherein said at least one window comprises a light transmitting body surrounded by a flange secured to the cover.

9. The airbag module of claim 8 wherein the light emitter is a light emitting diode.

10. The airbag module of claim 1 wherein the cover has a thickness greater than a thickness of the at least one window.

11. The airbag module of claim 10 wherein the light emitter is a light emitting diode.

12. An automotive vehicle airbag module having a light emitter incorporated therein and a cover for said airbag module having at least one light transmitting window integral with a front surface of said cover for transmitting light from said light emitter within said module to a vehicle occupant, wherein said cover and the at least one window are thermoplastic polymeric materials and the cover is of a different thermoplastic polymeric material than that of the at least one window.

13. The automotive vehicle airbag module of claim 12 wherein the light emitter is a light emitting diode.

14. An automotive vehicle airbag module having a cover, said cover having incorporated therein at least one window portion unitary with a front surface of said cover for transmitting light from a light emitter within said module to a vehicle occupant, wherein said cover is made of a transparent thermoplastic and wherein non-window portions of said thermoplastic cover have been painted.

15. The airbag module of claim 14 wherein a portion of the cover immediately adjacent said at least one window portion is thinned to increase its flexibility.

16. The airbag module of claim 15 wherein the light emitter is a light emitting diode.

17. The airbag module of claim 15 wherein the light emitter is a light emitting diode.

18. The airbag module of claim 17 wherein a portion of the cover immediately adjacent said at least one window portion is thinned to increase its flexibility.

* * * * *